US008568056B2

United States Patent
Miller, Jr. et al.

(10) Patent No.: US 8,568,056 B2
(45) Date of Patent: Oct. 29, 2013

(54) FORCE DECAY RELEASE MECHANISM

(75) Inventors: Richard D. Miller, Jr., Manchester, NH (US); Edward A. Gormley, New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 577 days.

(21) Appl. No.: 12/644,717

(22) Filed: Dec. 22, 2009

(65) Prior Publication Data

US 2011/0146426 A1    Jun. 23, 2011

(51) Int. Cl.
*F42B 10/56*        (2006.01)

(52) U.S. Cl.
USPC .............. 403/322.3; 102/387; 403/322.1; 403/325

(58) Field of Classification Search
USPC .......... 403/321, 322.1, 322.3, 325, 326, 324, 403/328, 348; 294/82.25, 82.26; 102/387; 244/147, 149, 151 B, 137.1, 137.4
See application file for complete search history.

(56) References Cited

U.S. PATENT DOCUMENTS

| | | | |
|---|---|---|---|
| 2,436,177 A | 2/1948 | Quilter | |
| 2,875,918 A * | 3/1959 | Baumier | 292/7 |
| 3,410,595 A | 11/1968 | Wolf, Jr. et al. | |
| 3,584,581 A | 6/1971 | Flatau et al. | |
| 4,028,948 A | 6/1977 | Frost et al. | |
| 4,088,353 A * | 5/1978 | Meyer | 292/36 |
| 4,407,201 A | 10/1983 | Jensen | |
| 4,632,010 A * | 12/1986 | Humphries et al. | 102/387 |
| 4,639,021 A * | 1/1987 | Hope | 292/7 |
| 4,753,027 A | 11/1988 | Jones | |
| 5,071,176 A * | 12/1991 | Smith | 292/7 |
| 5,111,748 A * | 5/1992 | Thurner et al. | 102/387 |
| 5,836,548 A * | 11/1998 | Dietz et al. | 244/137.1 |
| 5,855,449 A * | 1/1999 | Thomas | 403/322.1 |
| 6,769,832 B2 * | 8/2004 | Bedi | 403/326 |
| 6,783,162 B1 * | 8/2004 | Harper | 292/40 |
| 2001/0035637 A1 | 11/2001 | Thomas et al. | |
| 2004/0145972 A1 | 7/2004 | Gartsbeyn | |

* cited by examiner

*Primary Examiner* — Michael P Ferguson
(74) *Attorney, Agent, or Firm* — Maine Cernota Rardin; Andrew Paul Cernota

(57) ABSTRACT

A system is provided for the force decay triggered release of a device, the system comprising: a base; a plurality of retention rods extending from the base; a rotationally movable actuator, to which a linear force is configured to be applied, converting the linear force to a rotational force; a plurality of retention pins, the retention pins being coupled to the actuator, and each the pin being removably disposed within a retention rod of the plurality of retention rods, such that a rotation of the actuator withdraw each the pin from respective the rod; a force triggered detent, the detent allowing the rotation of the actuator when the rotational force exceeds a threshold level.

5 Claims, 6 Drawing Sheets

FORCE DECAY RELEASE MECHANISM

FIELD OF THE INVENTION

The invention relates to release mechanisms, and more particularly, to a mechanical trigger actuated by force decay.

BACKGROUND OF THE INVENTION

In devices that are deployed from high speed which require slowing by parachute, such as missile countermeasures or the parachutes of race cares, known systems for deploying such parachutes employ pyrotechnic devices to time and deploy parachute at a desired time.

Such systems pose health and safety hazards to workers and users as they are charged with explosive and potentially toxic material. Such devices are also prone to failure due to limited long storage before deployment, battery failure or voltage drop preventing firing of the pyrotechnic.

What is needed, therefore, are shelf stable techniques for releasing parachutes and similar devices at desired times.

SUMMARY OF THE INVENTION

One embodiment of the present invention provides a system for the force decay triggered release of a device, the system comprising: a base; a plurality of retention rods extending from the base; a rotationally movable actuator, to which a linear force is configured to be applied, converting the linear force to a rotational force; a plurality of retention pins, the retention pins being coupled to the actuator, and each the pin being removably disposed within a retention rod of the plurality of retention rods, such that a rotation of the actuator withdraw each the pin from respective the rod; a force triggered detent, the detent allowing the rotation of the actuator when the rotational force exceeds a threshold level.

Another embodiment of the present invention provides such a system wherein the actuator comprises an axially mounted disk having the retention pins tangentially mounted at a periphery thereof.

A further embodiment of the present invention provides such a system wherein the pins are spring steel.

Yet another embodiment of the present invention provides such a system wherein the retention rods are configured to separate from the base upon release of the pins.

A yet further embodiment of the present invention provides such a system wherein the actuator is configured in a plane orthogonal to the retention rods.

Even another embodiment of the present invention provides such a system further comprising cable guides disposed in the actuator, through which passes a cable to which the linear force is applied.

An even further embodiment of the present invention provides such a system wherein the detent is a spring loaded catch pawl.

Still another embodiment of the present invention provides such a system further comprising a housing, the housing being configured to be removed from the base when the retention pins are withdrawn from the retention rods.

A still further embodiment of the present invention provides such a system the system wherein the retention rods detachably couple the housing to the base.

Still yet another embodiment of the present invention provides such a system wherein the retention rods detach from the base in the absence of the housing.

One embodiment of the present invention provides a force decay trigger, the trigger comprising: a force loaded rotational member; at least one detent coupled to the rotational member, the detent being removably coupled to a trigger frame, such that when a rotational force is applied to the rotational member, the detent is removed from the trigger frame and the trigger frame is released.

Another embodiment of the present invention provides such a trigger wherein the trigger frame comprises at least one rod coupled to a trigger base.

A further embodiment of the present invention provides such a trigger, further comprising a cord by which a linear force is applied to the rotational member, the linear force being converted by the rotational member to the rotational force.

Yet another embodiment of the present invention provides such a trigger wherein the cord comprises a cord selected from the group of cords consisting of chains, cables, wires, ropes, or woven cords.

A yet further embodiment of the present invention provides such a trigger wherein the rotational member further comprises at least one cord guide, such that the linear force is converted to the rotational force.

Even another embodiment of the present invention provides such a trigger wherein the trigger frame comprises a plurality of rods extending from a trigger base to a detachable housing, the housing supporting the rotational member.

An even further embodiment of the present invention provides such a trigger wherein the at least one detent is a plurality of detents, wherein each the detent of the plurality of detents is removably coupled to at least one rod of the plurality of rods.

Still another embodiment of the present invention provides such a trigger further comprising a rotation resistance member, said rotation resistance member resisting rotation of said rotational member until the rotational force exceeds a threshold force.

A still further embodiment of the present invention provides such a trigger wherein said threshold force is provided by a spring bias on the rotation resistance member.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
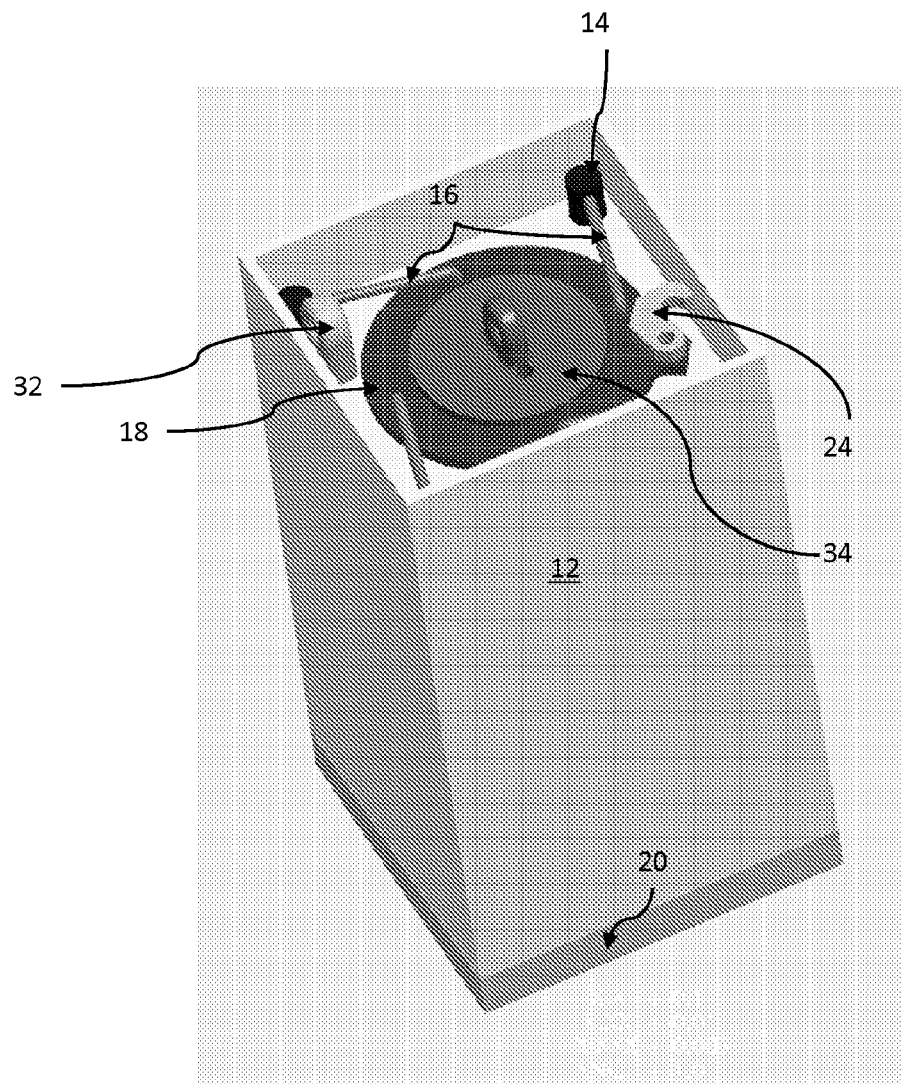
FIG. 1 is a perspective drawing illustrating a force decay release mechanism configured in accordance with one embodiment of the present invention.
Figure 4:
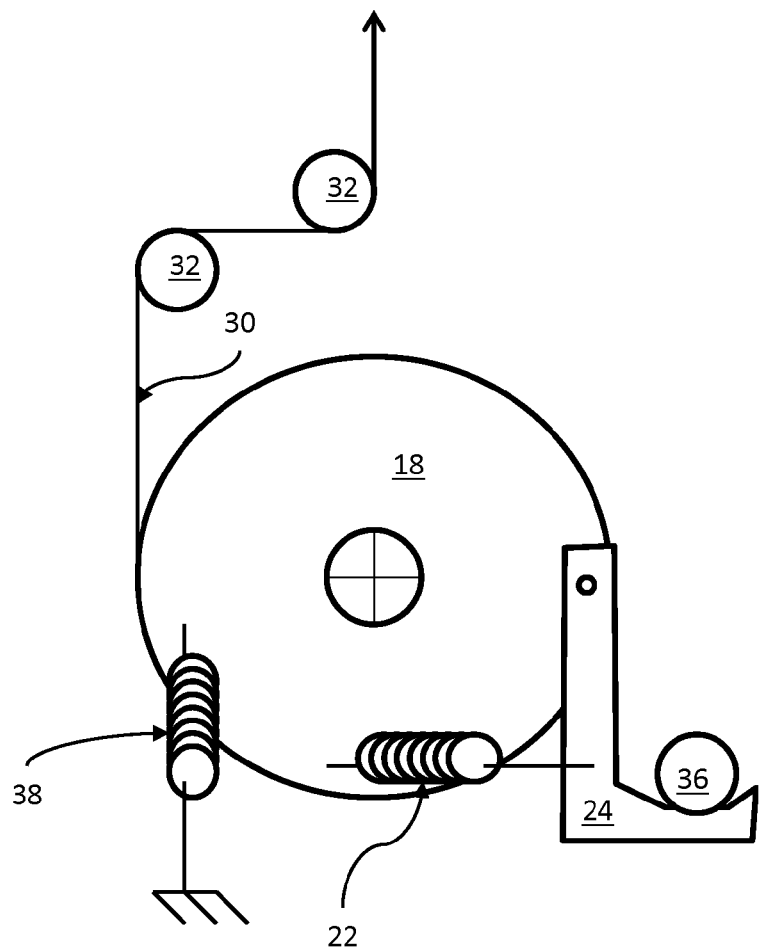
FIG. 4 is a schematic drawing illustrating a force decay release mechanism configured in accordance with one embodiment of the present invention.

As illustrated in FIG. 1 an assembly configured according to one embodiment of the present invention comprises a housing 12 through which extend retention rods 14, the retention rods 14 being engaged in an unreleased stage by corresponding retention pins 16 and disposed in a retention base 28. The retention pins 16 disposed within an actuation plate 18 are configured to secure the housing 12 to a base 20 by interlocking with the retention rods 14. Rotation of the actuation plate 18 removes the pins 16, allowing the housing 12 to be pulled free of the rods 14. Such a release is illustrated in FIG. 4. The actuation plate 18 is configured to be rotated by a force applied by a cable or cord 30 disposed about a series of cable guides 32. In one embodiment, the rotation imparted to the actuation plate by the cable or cord may be about an axis parallel to the axes of the rods 14. In one such embodiment it may be applied via a central cap 34. Alternative embodiments may have the orientation of the actuation plate in a different position, for example, where the orientation of the axis is orthogonal to the axes of the rods.

Figure 2:
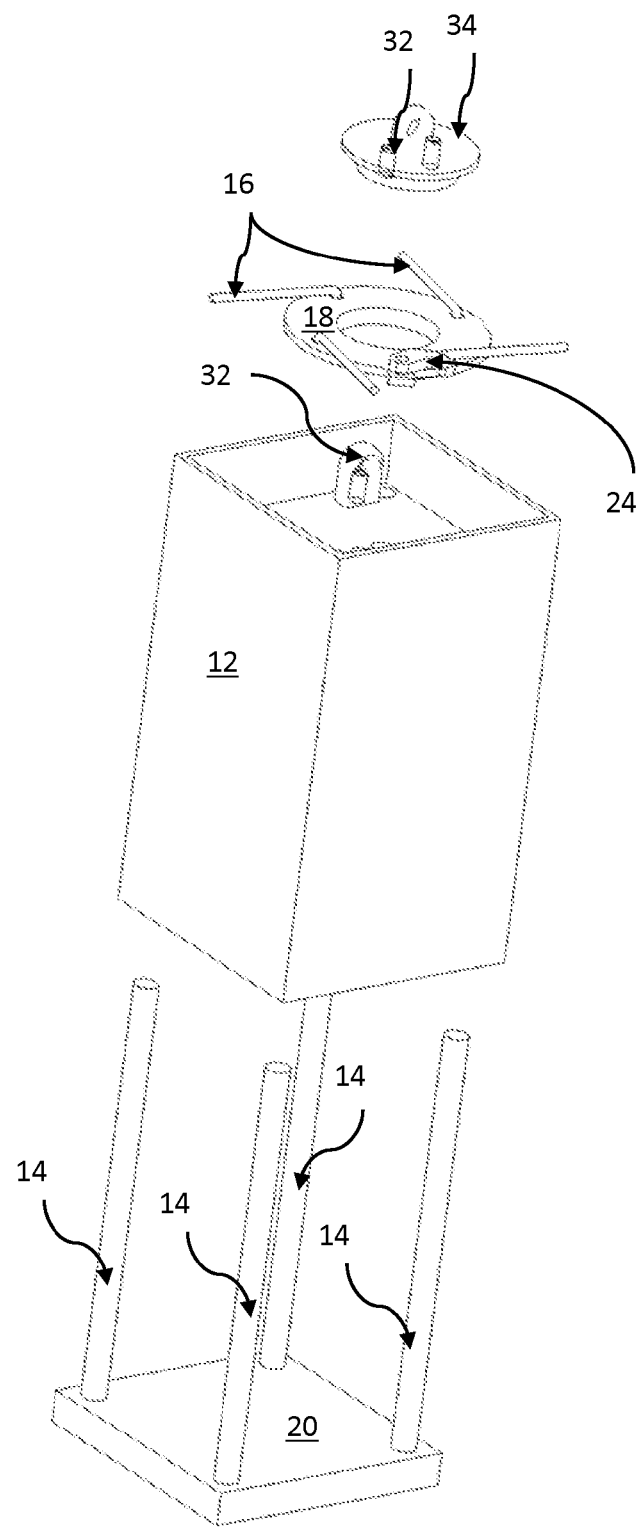
FIG. 2 is an exploded perspective drawing illustrating a force decay release mechanism configured in accordance with one embodiment of the present invention.
Figure 3:
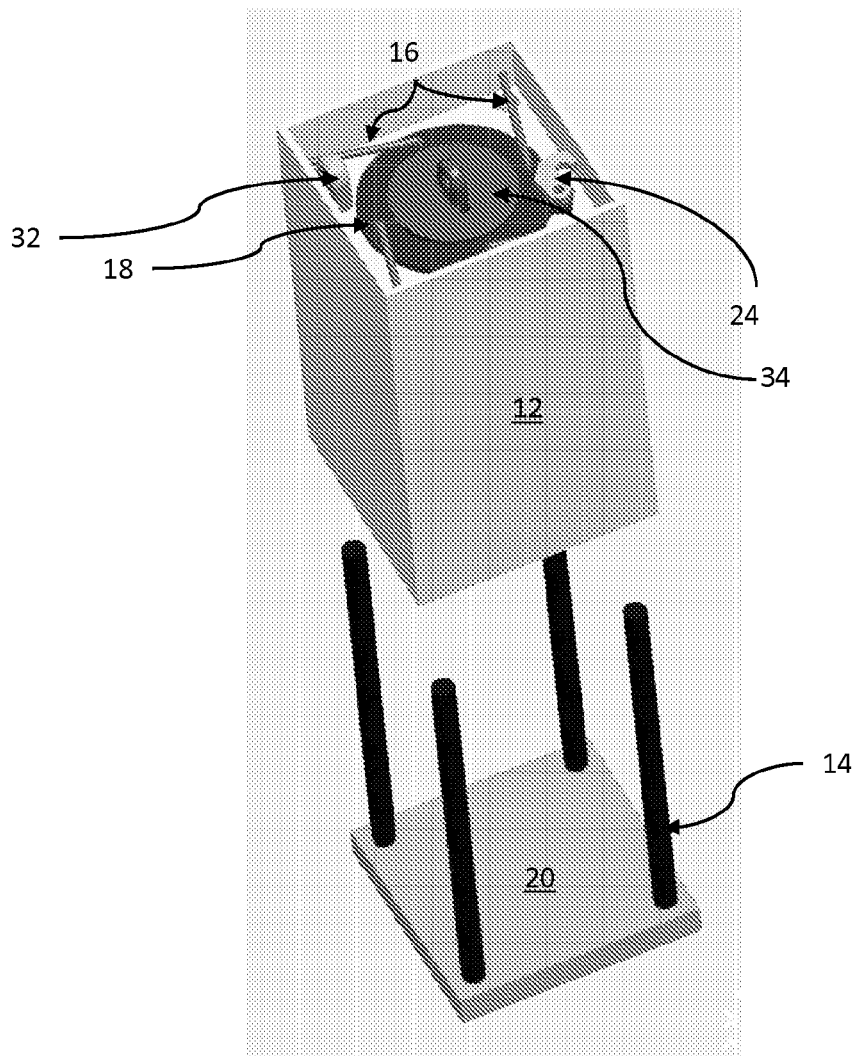
FIG. 3 is a perspective drawing illustrating a force delay release mechanism in a released position and configured in accordance with one embodiment of the present invention.
Figure 5:
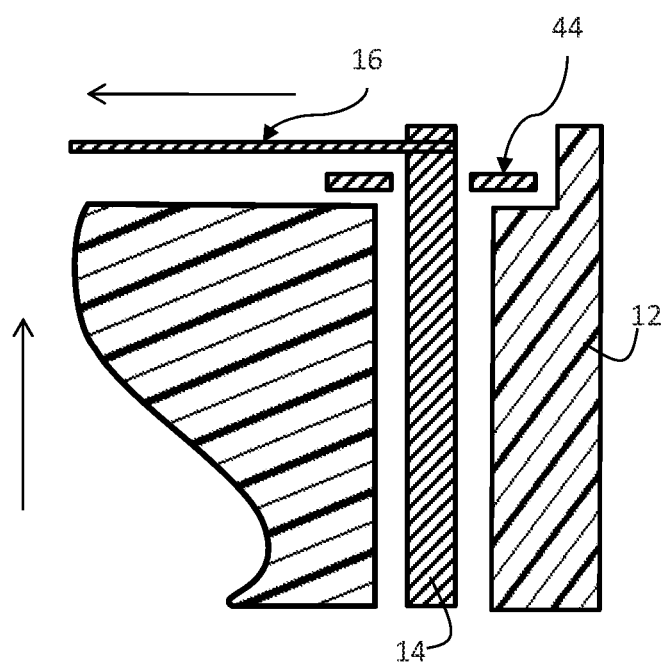
FIG. 5 is an elevation view of a retaining rod assembly of a force decay release mechanism configured in accord with one embodiment of the present invention.

An exploded view of one embodiment of the present invention is shown in FIG. 2. In such an embodiment, initially, a torsion spring 22 provides a preload on a spring loaded catch pawl 24 (also illustrated in FIG. 3) that, when the device is loaded is latched to a pawl retention pin 26. The catch 24 prevents rotation of the disk until a sufficient overcoming force is applied via a cable or line 30. Once the force of the Actuation Disk torsion (in one embodiment provided by a spring 38) has been overcome, the spring loaded catch pawl 24 is free to disengage the pin. As the force resisting rotation of the disk decays, the disk is allowed to rotate. As illustrated in FIG. 5, the minimum rotational force is set such that the four retaining pins 16 disengage the retaining posts 14 at which time, the entire housing 12 is extracted by the remaining excess force, and subsequent actions or processes take place and inherent to the payload assembly.

In one embodiment of the present invention, the retaining rods 14 are configured to release from the base 20 upon removal of the housing 12. In such an embodiment, the removal of the housing 12 releases tension on the rods 14, thereby permitting the rods to be removed from the base 28, decreasing chances that the residual rods would catch or inhibit the operation of the post release mechanism.

In one embodiment of the present invention the housing may be configured from a suitable durable material, including but not limited to plastic, resin, machined, composite materials, stamped or died metals and metal alloys. Rods 14 may be configured from metals or composite material or such other material as is suitable for connecting the base with the housing, even under the forces imposed by the various applications in which such a release mechanism may be employed. Examples of suitable material include composites, plastics, metals, and ceramics.

As illustrated in FIG. 5, in one embodiment of the invention, a washer 44 may be disposed about the retention rod 14 between the retention pin 16 and the housing 12. The withdrawal of the retention pin 16 allows the rods 14 to be withdrawn and the housing to detach from the base. In such a situation, the rods 14 may simply fall from the base so as to not extend from the base after the release of the housing 12.

Figure 6:
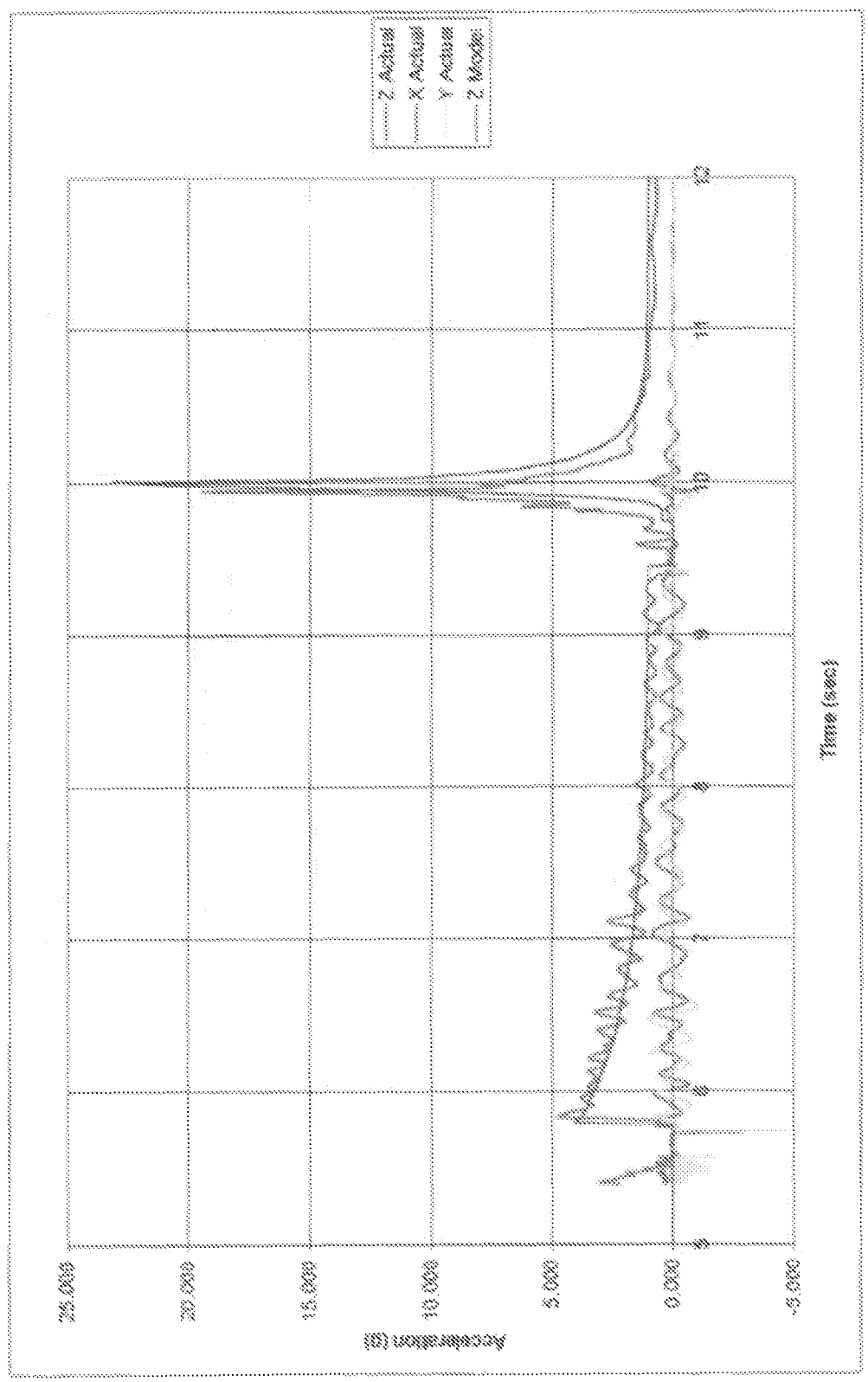
FIG. 6 is a diagram of a force decay curve of a parachute release to which a release mechanism such as one embodiment of the present invention may be applied.

As illustrated in FIG. 6, the graph of acceleration over time of a device delivered by such a release mechanism. As can be inferred from the graph, the forces applied to the device during deployment, create an effecting time release curve, resulting in deployment at, in this embodiment, about 9.5 seconds.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the force decay triggered release of a device, the system comprising:
   a housing defining an interior cavity;
   a rotationally movable actuator comprising a disk which is pivotably mounted about a central pivot pin within the housing;
   a plurality of retention pins, said retention pins each being tangentially mounted to a peripheral edge of said disk at a proximal end thereof;
   a base;
   a plurality of retention rods extending from said base and being receivable within the interior cavity of said housing;
   each said retention pin having a distal end being removably disposed within a pin receiving port in a respective said retention rod to couple said base to said housing, said disk being rotationally biased to a coupled position in which said retention pins engage and retain the retention rods within the interior cavity of said housing, and said housing being configured to be removed from said base when said retention pins are withdrawn from said retention rods;
   a cable being tangentially fixed to the peripheral edge of said disk and to which a linear force is applied to rotate said disk about said central pivot pin to a release position in which said retention pins release from said retention rods; and
   a force triggered detent allowing the rotation of said disk when a rotational force exceeds a threshold level, said detent comprising a catch pawl pivotably mounted abut a pivot pin fixed to the peripheral edge of said disk and rotationally biased to a latched position in which said pawl engages a catch pin fixed to said housing to retain said disk in the coupled position, said pawl being pivoted to an unlatched position by rotation of said disk to release said pawl from said catch pin.

2. The system according to claim 1 wherein said retention pins are spring steel.

3. The system according to claim 1 wherein said disk is rotatable in a plane orthogonal to said retention rods.

4. The system according to claim 1 further comprising a cable guide disposed in said housing configured to receive a said cable.

5. The system according to claim 1 wherein said detent is a spring loaded catch pawl.

* * * * *